United States Patent
Oman

(10) Patent No.: US 12,030,516 B2
(45) Date of Patent: Jul. 9, 2024

(54) DRIVER ALERT SYSTEM THROUGH ALGORITHMIC BRAKING EVENTS FOR ADVANCED DRIVER-ASSISTANCE SYSTEM

(71) Applicant: APTIV TECHNOLOGIES LIMITED, St. Michael (BB)

(72) Inventor: Todd Paul Oman, Greentown, IN (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 46 days.

(21) Appl. No.: 17/750,501

(22) Filed: May 23, 2022

(65) Prior Publication Data

US 2023/0406343 A1 Dec. 21, 2023

(51) Int. Cl.
*B60W 50/16* (2020.01)
*B60W 10/18* (2012.01)
*B60W 40/068* (2012.01)
*B60W 40/072* (2012.01)
*B60W 40/08* (2012.01)
*B60W 40/105* (2012.01)
B60W 50/14 (2020.01)

(52) U.S. Cl.
CPC ............ *B60W 50/16* (2013.01); *B60W 10/18* (2013.01); *B60W 40/068* (2013.01); *B60W 40/072* (2013.01); *B60W 40/08* (2013.01); *B60W 40/105* (2013.01); B60W 2040/0818 (2013.01); B60W 2050/143 (2013.01); B60W 2050/146 (2013.01); B60W 2540/229 (2020.02)

(58) Field of Classification Search
CPC .... B60W 50/16; B60W 10/18; B60W 40/068; B60W 40/072; B60W 40/08; B60W 40/105; B60W 2040/0818; B60W 2050/143; B60W 2050/146; B60W 2540/229

See application file for complete search history.

(56) References Cited

U.S. PATENT DOCUMENTS

| | | | |
|---|---|---|---|
| 9,235,987 B2 * | 1/2016 | Green | G08G 1/00 |
| 9,483,059 B2 | 11/2016 | Caveney | |
| 10,745,030 B2 * | 8/2020 | Kapuria | G06V 40/168 |
| 10,783,725 B1 * | 9/2020 | Gaudin | G07C 5/008 |
| 11,269,420 B1 * | 3/2022 | Marti | G06V 20/597 |
| 2009/0091435 A1 | 4/2009 | Bolourchi | |
| 2011/0205045 A1 * | 8/2011 | Pilutti | G08G 1/167 |
| | | | 701/31.4 |

(Continued)

Primary Examiner — Mohamed Barakat
(74) Attorney, Agent, or Firm — Miller Johnson

(57) ABSTRACT

Vehicle advanced driver-assistance system (ADAS) techniques include, during an ADAS event where a controller at least partially takes control of the vehicle from a driver, detecting, using at least a driver monitoring system, a driver attentiveness level and a control urgency level indicative of how important it is for the driver to potentially retake control of the vehicle, determining, based on the detected driver attentiveness level and the detected control urgency level, a desired driver alert level for attempting to regain the driver's attention for the driver to potentially retake control of the vehicle from a plurality of predetermined driver alert levels each including at least one of an audio/visual/haptic (AVH) alert and a degree of a braking event, and commanding, according to the desired driver alert level, at least one of an AVH alert system and an anti-lock braking system (ABS).

19 Claims, 4 Drawing Sheets

(56) References Cited

U.S. PATENT DOCUMENTS

| | | | |
|---|---|---|---|
| 2013/0342365 A1 | 12/2013 | Kiefer et al. | |
| 2018/0086264 A1* | 3/2018 | Pedersen | H04B 5/0081 |
| 2019/0213429 A1* | 7/2019 | Sicconi | G06F 3/012 |
| 2021/0016804 A1* | 1/2021 | Hara | B60W 60/0057 |
| 2021/0188289 A1* | 6/2021 | Oba | B60W 60/005 |

* cited by examiner

Example of Alert Delivery Decision Matrix

| Driver Inattentive | Urgency | Vehicle Speed | Road Friction | Alert Level |
|---|---|---|---|---|
| 1 | 0 | 0 | 0 | 1 |
| 2 | 1 | 0 | 3 | 2 |
| 2 | 1 | 0 | 2 | 2 |
| 2 | 1 | 0 | 1 | 1 |
| 3 | 2 | 0 | 3 | 3 |
| 3 | 2 | 0 | 2 | 2 |
| 3 | 2 | 0 | 1 | 1 |
| 0 | 3 | 0 | 3 | 4 |
| 0 | 3 | 0 | 2 | 3 |
| 0 | 3 | 1 | 1 | 2 |
| 0 | 3 | 2 | 1 | 1 |
| 0 | 3 | 3 | 1 | 1 |

Scale: 0: any level, 1: low, 2: medium, 3: high

Alert Level:
1: audio alarm, visual illumination, & haptic (AVH)
2: AVH+low brake
3: AVH+medium brake
4: AVH+high brake

FIG. 2

DRIVER ALERT SYSTEM THROUGH ALGORITHMIC BRAKING EVENTS FOR ADVANCED DRIVER-ASSISTANCE SYSTEM

FIELD

The present disclosure generally relates to vehicle advanced driver-assistance systems (ADAS) and, more particularly, to a driver alert system through algorithmic braking events for a vehicle ADAS.

BACKGROUND

Today's vehicles often include one or more advanced driver-assistance systems (ADAS) each configured to assist a driver of the vehicle in a particular aspect of operating the vehicle (driving, parking, etc.). Because a majority of vehicle accidents occur to human error, ADAS are developed to improve safety and vehicle operation. In many aspects, the ADAS alerts the driver of potential problems while implementing safeguard procedures (e.g., avoidance). In some cases, ADAS alerts are provided to gain the driver's attention so she/he can take over control of the vehicle if necessary. One conventional ADAS alert technique focuses on giving haptic, audio, and/or visual feedback. These conventional techniques, however, may be inadequate to gain the driver's attention to interact with the vehicle. Haptic systems, in particular, can also add significant costs to the vehicle.

Another conventional ADAS alert technique uses one or more vehicle control systems to generate a temporary and irregular full vehicle movement ("swerving"). This technique is particularly intrusive and may cause the vehicle to become unstable, which is of greater concern on narrow roads or construction zones, especially on slippery surfaces, and/or may require too much time to gain the driver's attention due to the time required to execute adequate cycles and/or magnitudes of the vehicle movement. Thus, while these conventional ADAS alert techniques do work for their intended purpose, there exists an opportunity for improvement in the relevant art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, an advanced driver-assistance system (ADAS) for a vehicle is presented. In one exemplary implementation, the vehicle ADAS comprises an anti-lock braking system (ABS) configured to apply a braking force at a driveline of the vehicle, a driver monitoring system configured to monitor an attentiveness and/or vehicle interactivity by a driver of the vehicle, an audio/visual/haptic (AVH) alert system configured to generate an AVH output for the driver including at least one of an audio alert, a visual alert, and a haptic alert, and a controller in electronic communication with the ABS, the driver monitoring system, and the AVH alert system, and configured to initiate an ADAS event during which the controller at least partially takes control of the vehicle from the driver, during the ADAS event, detect, using at least the driver monitoring system (i) a driver attentiveness level and (ii) a control urgency level indicative of how important it is for the driver to potentially retake control of the vehicle, based on the detected driver attentiveness level and the detected control urgency level, determine a desired driver alert level for attempting to regain the driver's attention for the driver to potentially retake control of the vehicle, wherein the desired driver alert level is determined from a plurality of predetermined driver alert levels each including at least one of (i) an AVH alert and (ii) a degree of a braking event, and command at least one of the AVH alert system and the ABS according to the desired driver alert level.

In some implementations, the desired driver alert level is determined based further on a speed of the vehicle and a friction of a road along which the vehicle is traveling. In some implementations, the plurality of predetermined driver alert levels are defined by a decision matrix that indicates a predetermined driver alert level for each combination of (i) driver attentiveness level, (ii) control urgency level, (iii) vehicle speed, and (iv) road friction. In some implementations, the braking event degree is one of (i) low, (ii) medium, and (iii) high. In some implementations, a low degree braking event a first intensity, a medium degree braking event has a second intensity, and a high degree braking event has a third intensity, and wherein the third intensity is greater than the second intensity and the second intensity is greater than the first intensity. In some implementations, the first, second, and third intensities are each defined by at least one of (i) a braking pressure, (ii) a braking duration, and (iii) a number of braking pulses.

In some implementations, the controller is configured to provide multiple desired driver alert levels and command at least one of the AVH alert system and the ABS system according to the multiple desired driver alert level during a period. In some implementations, the multiple desired driver alert levels are escalating when the driver's attention does not improve, and the multiple desired driver alert levels are deescalating when the driver's attention does improve. In some implementations, the desired driver alert level is determined based further on and the decision matrix further indicates the predetermined driver alert level for each combination of driver attentiveness level, control urgency level, vehicle speed, road friction at least one of (i) a distance of another vehicle behind the vehicle, (ii) a curvature of the road, (iii) a planned trajectory of the vehicle, and (iv) another contextual element of the road.

According to another aspect of the present disclosure, an ADAS method for a vehicle is presented. In one exemplary implementation, the ADAS method comprises establishing, by a controller of the vehicle, communication with (i) an ABS configured to apply a braking force at a driveline of the vehicle, (ii) a driver monitoring system configured to monitor an attentiveness and/or vehicle interactivity by a driver of the vehicle, and (iii) an AVH alert system configured to generate an AVH output for the driver including at least one of an audio alert, a visual alert, and a haptic alert, initiating, by the controller, an ADAS event during which the controller at least partially takes control of the vehicle from the driver, and during the ADAS event: detecting, by the controller and using at least the driver monitoring system (i) a driver attentiveness level and (ii) a control urgency level indicative of how important it is for the driver to potentially retake control of the vehicle, based on the detected driver attentiveness level and the detected control urgency level, determining, by the controller, a desired driver alert level for attempting to regain the driver's attention for the driver to potentially retake control of the vehicle, wherein the desired driver alert level is determined from a plurality of predetermined driver alert levels each including at least one of (i) an AVH alert and (ii) a degree of a braking event, and commanding, by the controller, at least one of the AVH alert system and the ABS according to the desired driver alert level.

In some implementations, the desired driver alert level is determined based further on a speed of the vehicle and a friction of a road along which the vehicle is traveling. In some implementations, the plurality of predetermined driver alert levels are defined by a decision matrix that indicates a predetermined driver alert level for each combination of (i) driver attentiveness level, (ii) control urgency level, (iii) vehicle speed, and (iv) road friction. In some implementations, the braking event degree is one of (i) low, (ii) medium, and (iii) high. In some implementations, a low degree braking event a first intensity, a medium degree braking event has a second intensity, and a high degree braking event has a third intensity, and wherein the third intensity is greater than the second intensity and the second intensity is greater than the first intensity. In some implementations, the first, second, and third intensities are each defined by at least one of (i) a braking pressure, (ii) a braking duration, and (iii) a number of braking pulses.

In some implementations, the controller is configured to provide multiple desired driver alert levels and command at least one of the AVH alert system and the ABS system according to the multiple desired driver alert level during a period. In some implementations, the multiple desired driver alert levels are escalating when the driver's attention does not improve, and the multiple desired driver alert levels are deescalating when the driver's attention does improve. In some implementations, the desired driver alert level is determined based further on and the decision matrix further indicates the predetermined driver alert level for each combination of driver attentiveness level, control urgency level, vehicle speed, road friction at least one of (i) a distance of another vehicle behind the vehicle, (ii) a curvature of the road, (iii) a planned trajectory of the vehicle, and (iv) another contextual element of the road.

According to yet another aspect of the present disclosure, an ADAS for a vehicle is presented. In one exemplary implementation, the vehicle ADAS comprises an ABS means for apply a braking force at a driveline of the vehicle, a driver monitoring means for monitoring an attentiveness and/or vehicle interactivity by a driver of the vehicle, an AVH alert means for generating an AVH output for the driver including at least one of an audio alert, a visual alert, and a haptic alert, and a controller means in electronic communication with the ABS means, the driver monitoring means, and the AVH alert means, and for initiating an ADAS event during which the controller means at least partially takes control of the vehicle from the driver, during the ADAS event, detecting, using at least the driver monitoring means, (i) a driver attentiveness level and (ii) a control urgency level indicative of how important it is for the driver to potentially retake control of the vehicle, based on the detected driver attentiveness level and the detected control urgency level, determining a desired driver alert level for attempting to regain the driver's attention for the driver to potentially retake control of the vehicle, wherein the desired driver alert level is determined from a plurality of predetermined driver alert levels each including at least one of (i) an audio/visual/haptic (AVH) alert and (ii) a degree of a braking event, and commanding at least one of the AVH alert means and the ABS means according to the desired driver alert level.

In some implementations, the desired driver alert level is determined by the controller means based further on a speed of the vehicle and a friction of a road along which the vehicle is traveling.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 is a table illustrating an example alert delivery decision matrix according to some implementations of the present disclosure;

DETAILED DESCRIPTION

As discussed above, there exists an opportunity for improvement in the art of vehicle advanced driver-assistance system (ADAS) alert techniques. In some cases, ADAS alerts are provided to gain the driver's attention so she/he can take over control of the vehicle if necessary. One conventional ADAS alert technique focuses on giving audio, visual, and/or haptic (AVH) feedback. These conventional techniques, however, may be inadequate to gain the driver's attention to interact with the vehicle. Haptic systems, in particular, can also add significant costs to the vehicle. Another conventional ADAS alert technique uses one or more vehicle control systems to generate a temporary and irregular full vehicle movement ("swerving"). This technique is particularly intrusive and may cause the vehicle to become unstable, which is of greater concern on narrow roads or construction zones, especially on slippery surfaces, and/or may require too much time to gain the driver's attention due to the time required to execute adequate cycles and/or magnitudes of the vehicle movement. Thus, while these conventional ADAS alert techniques do work for their intended purpose, there exists an opportunity for improvement in the relevant art.

Accordingly, improved ADAS alert systems and methods are presented herein. These ADAS alert techniques utilize a vehicle's anti-lock braking system (ABS) to generate varying braking events to alert the driver of the vehicle. These alerts facilitate trying to bring an unconscious driver to consciousness during non-severe scenarios (e.g., a prolonged eye closure) as opposed to more severe scenarios (e.g., severe hypoglycemia or heart attack) where the vehicle's ADAS system would need safely stop the vehicle when the alert fails to bring the driver to the controls. Potential benefits, in addition to improved driver and vehicle safety, include reduced vehicle costs (i.e., no additional systems, such as haptic systems) and/or an improved driver experience due to less intrusiveness (e.g., not intrusively taking over control of the vehicle). Some key aspects to the techniques of the present disclosure include, but are not limited to: (i) increased effectiveness over AVH-only techniques, (ii) the ability to provide a "jolt" via a safer ABS-regulated braking force without changing vehicle direction (e.g., which could be particularly unsafe in certain environmental conditions, such as snow/ice), (iii) time-efficient and escalating/deescalating alerts over a period, if time permits, and (iv) the ability to vary each of braking force magnitude/intensity, duration, and pulsation.

Figure 1:
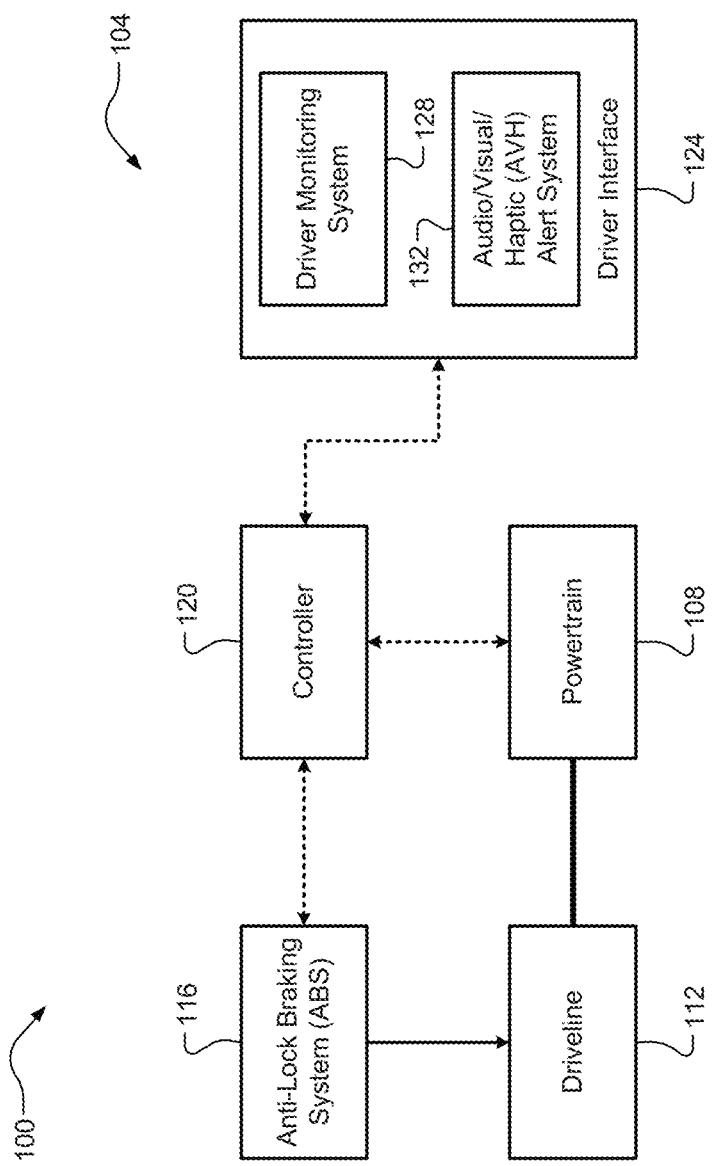
FIG. 1 is a functional block diagram of a vehicle having an example advanced driver assistance system (ADAS) for driver alerts through algorithmic braking events according to some implementations of the present disclosure.

Referring now to FIG. 1, a functional block diagram of a vehicle 100 having an example ADAS system 104 according to some implementations of the present disclosure is illustrated. The vehicle 100 includes a powertrain 108 (an engine, an electric motor, or combinations thereof, plus a transmission) configured to generate and transfer drive torque to a driveline 112 (e.g., wheels/tires connected to axles/driveshafts). The powertrain 108 could be any suitable powertrain (conventional engine-only, hybrid, all-electric, etc.) and could also include additional non-illustrated components (crankshaft/motor belts, battery systems, etc.). An ABS system 116 is in electronic communication with a controller 120 and is configured to generate and apply a braking force at the driveline 112 to slow/stop the vehicle 100 from moving. This can include varying braking force magnitude or intensity, duration, and pulsation. A driver interface 124, also in electronic communication with the controller 120, receives captured input of and generates output to a driver of the vehicle 100. Two particularly important components of the driver interface 124 are a driver monitoring system 128 that monitors the driver's attentiveness and/or interactivity with the vehicle 100 and an AVH alert system 132 that generates audio, visual, and/or haptic outputs or alerts for the driver, which will now be discussed in greater detail.

In some implementations, the driver monitoring system 128 could include collection of cameras/sensors that monitors a driver's attentiveness (eyes/gaze, tiredness, heartbeat, etc.) and interactivity with components of the vehicle 100 (steering wheel control/contact, accelerator/brake pedal modulation, etc.). In some implementations, audio alerts could include audible sounds such as beeps and/or voice recordings, visual alerts could include infotainment/dashboard/heads-up display of lights/images/readable messages or combinations thereof, and haptic alerts could include physical pulsations o or vibrations (steering wheel, driver's seat, etc.). The controller 120 is configured to initiate an ADAS event during which the controller 120 at least partially takes control of the vehicle from the driver. This could include any suitable ADAS event varying from level 1 (L1) to level (L4) full autonomy. Non-limiting examples of ADAS events include adaptive cruise control (ACC), lane keeping/centering, and "hands-off" autonomous driving. During the ADAS event, the controller 120, e.g., using the driver monitoring system 128, detects (i) an attentiveness level of the driver indicative of how much the driver is paying attention and (ii) a control urgency level indicative of how important it is for the driver to potentially retake control of the vehicle 100. Based on the detected driver attentiveness level and the detected control urgency level, the controller 120 can then determine a desired driver alert level for attempting to regain the driver's attention for the driver to potentially retake control of the vehicle 100.

Referring now to FIG. 2 and with continued reference to FIG. 1, the desired driver alert level is determined from a plurality of predetermined driver alert levels each including at least one of (i) an AVH alert and (ii) a degree of a braking event. FIG. 2, for example, illustrates a table representative of an example alert delivery decision matrix 300 according to some implementations of the present disclosure. In some implementations, the desired driver alert level is determined based further on a speed of the vehicle 100 and a friction of a road along which the vehicle is traveling. The vehicle speed could be measured by a vehicle speed sensor or otherwise modeled and the road friction could be measured and/or modeled based on known environmental conditions (e.g., current weather and low temperatures indicative of snow/ice) and feedback from the driveline 112 (e.g., wheel/tire slippage). As shown, a plurality of predetermined driver alert levels are defined by the decision matrix 200 that indicates a predetermined driver alert level (e.g., 0 through 4) for each combination of (i) driver attentiveness level, (ii) control urgency level, (iii) vehicle speed, and (iv) road friction. For purposes of this disclosure, the braking event degree is one of (i) low, (ii) medium, and (iii) high. In other words, a low degree braking event a first intensity, a medium degree braking event has a second intensity, and a high degree braking event has a third intensity, with the third intensity being greater than the second intensity and the second intensity being greater than the first intensity. It will be appreciated, however, that the braking event degree could be one of fewer options or many more options (i.e., as complex of a system as desired/necessary).

Figure 3A:
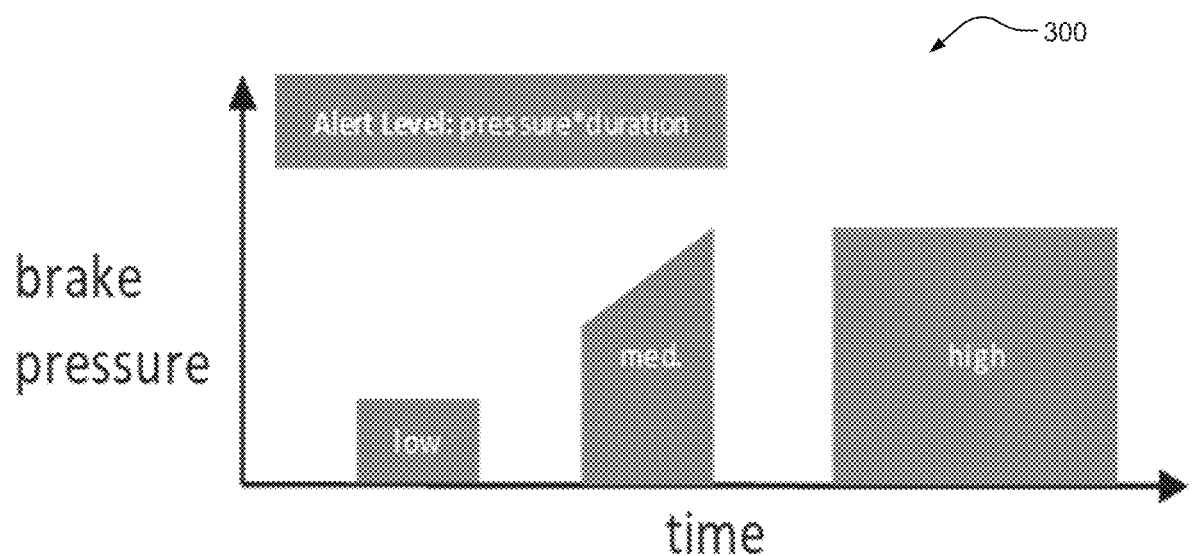
FIGS. 3A-3B are plots illustrating different example algorithmic braking events (varying brake pressures over time) according to some implementations of the present disclosure.
Figure 3B:
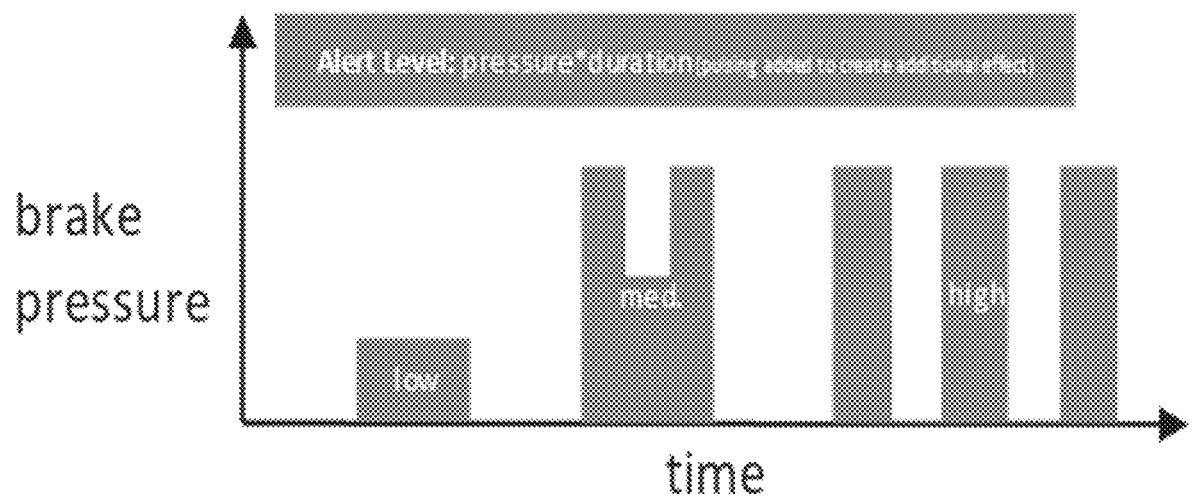

Referring now to FIGS. 3A-3B and with continued reference to FIGS. 1-2, plots 300, 350 are illustrated of different example algorithmic braking events (varying brake pressures over time with optional pulsations) according to some implementations of the present disclosure. These plots 300, 350 merely illustrate various ways to vary or modulate a degree of a braking event. The three main aspects are (i) the generated/applied brake pressure, (ii) the duration of the applied brake pressure (and whether it varies during that period), and (iii) whether or not pulsation is applied via the ABS 116 (e.g., a number of pulses in a given period). Pulsation, for example, could create an additional effect that could be more noticeable to particular drivers than traditional constant or linearly increasing braking pressures. Referring back to FIG. 2, and as previously mentioned, the decision matrix 200 could be as complex as desired or necessary for a particular application. In other words, more different levels of alert (i.e., more than four) could be provided, and additional inputs/factors could also be taken into account in the decision matrix 200. For example only, the decision matrix 200 could the predetermined driver alert level for each combination of driver attentiveness level, control urgency level, vehicle speed, and road friction, and based further on at least one of (i) a distance of another vehicle behind the vehicle, (ii) a curvature of the road, (iii) a planned trajectory of the vehicle, and (iv) another contextual element of the road (construction zone restrictions, arrival at a planned freeway exit, etc.). In some cases, all eight inputs/factors or more could be taken into account.

Finally, once the desired driver alert level is determined by the controller 120, the controller 120 can command at least one of the AVH alert system 132 and the ABS 116 according to the desired driver alert level. As generally discussed herein/above, this likely begins with some combination of audio/visual/haptic alert(s) by the AVH alert system 132 and, for more severe/intense driver alerts, adds in braking events by the ABS 116. In the decision matrix 200 of FIG. 2, for example, the four (1-4) levels (actually five levels, including zero or 0) from lower-to-higher driver alert levels, include no output (0), AVH-only output (1), AVH and low braking output (2), AVH and medium braking output (3), and AVH and high braking output (4). In some implementations, the controller 120 is configured to provide multiple desired driver alert levels and command at least one of the AVH alert system 132 and the ABS system 116 according to the multiple desired driver alert levels (i.e., sequentially) during a period. This could depend, however, on whether time permits for such. In other words, the urgency may be too soon or short notice to be able to provide the driver with multiple different driver alerts. In such cases, the more severe/intense driver alert could be provided as the urgency indicates. Specific examples of multiple driver alerts include escalating and deescalating driver alerts. For example, the multiple desired driver alert levels could escalate in severity/intensity when the driver's attention does not improve, and the multiple desired driver alert levels could deescalate when the driver's attention does improve (and time permits). This gradual driver alert change could be more pleasant for the driver as opposed to a single (possibly excessive) driver alert.

Figure 4:
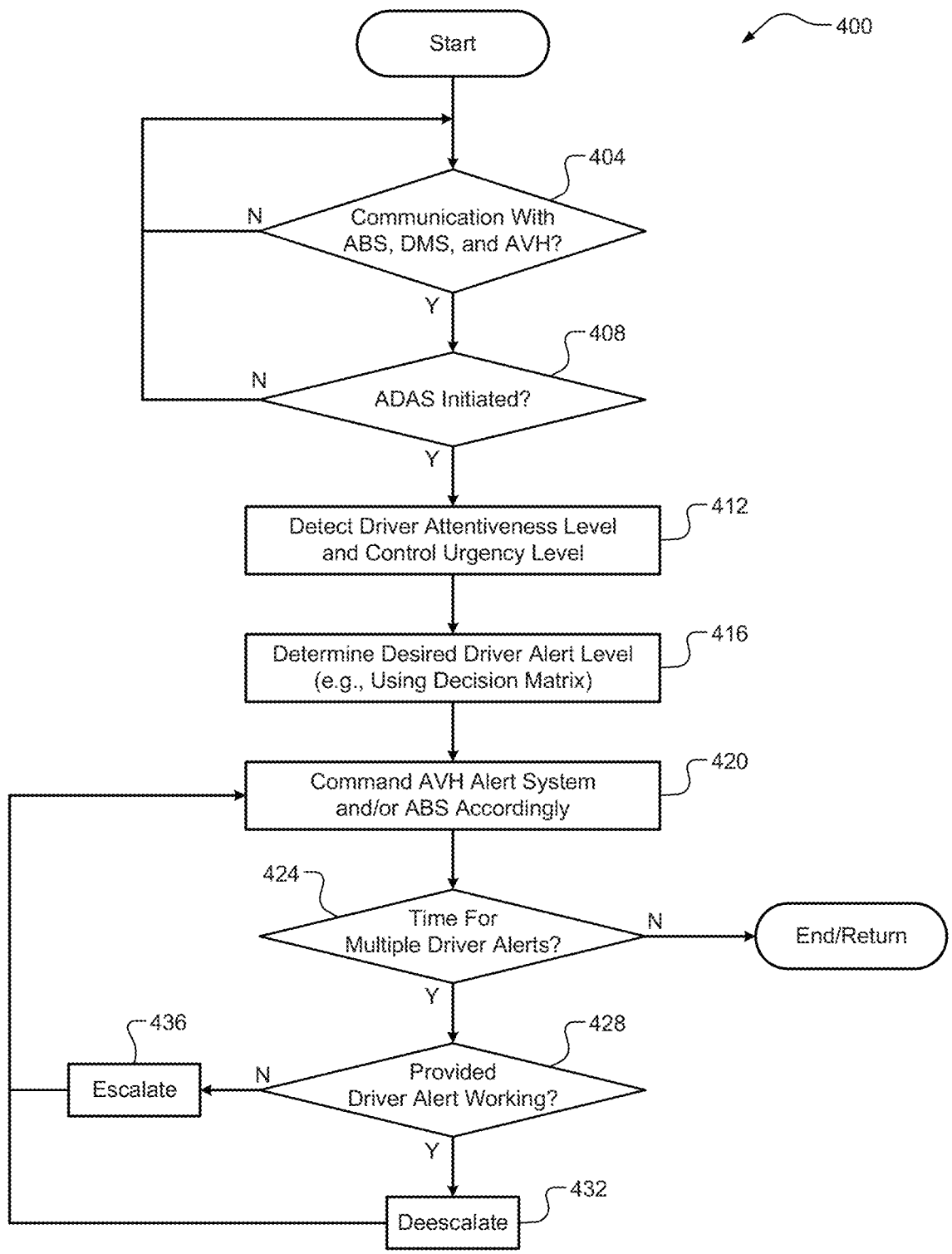
FIG. 4 is a flow diagram of an example driver alert method through algorithmic braking events by an ADAS of a vehicle according to some implementations of the present disclosure.

Referring now to FIG. 4, a flow diagram of an example driver alert method 400 through algorithmic braking events by an ADAS of a vehicle according to some implementations of the present disclosure is illustrated. While the vehicle 100, its ADAS system 104 and components are specifically referenced herein for illustrative and explanatory purposes, it will be appreciated that the method 400 could be applicable to any suitable vehicle/ADAS system. At 404, the controller 120 determines whether communication with the ABS, the driver monitoring system ("DMS") 128, and the AVH alert system 132 is established. This could require, for example, the vehicle 100 to be powered on/running. When true, the method 400 proceeds to 408. Otherwise, the method 400 ends or returns to 404. At 408, the controller 120 determines whether an ADAS event has been initiated during which the controller 120 at least partially takes control of the vehicle 100 from the driver. This ADAS event could have its own set of appropriate pre-conditions or enable criteria, such as, but not limited to, the transmission (not shown) of the powertrain 108 being in Drive, vehicle speed being in an acceptable range, and possibly the driver manually requesting (e.g., via a button or voice command) initiation of the ADAS event. When true, the method 400 proceeds to 412. Otherwise, the method 400 ends or returns to 408 or 404. At 412, the controller 120 detects (i) the driver attentiveness level and (ii) the control urgency level. At 416, the controller 120 determines (based on the above) the desired driver alert level. At 420, the controller 120 commands at least one of the AVH alert system 132 and the ABS 116 according to the desired driver alert level.

At 424, the controller 120 determines whether time is permitting to provide another driver alert level, if necessary. When time does not permit at 424 or further driver alerting is not necessary (or is unavailable, i.e., the maximum driver alert failed), the method 400 ends or returns to 404. This could also include some sort of final remedial action if necessary (e.g., full takeover and safely bringing the vehicle 100 to a safe stop). When time does permit at 424, the method 400 proceeds to 428 where the controller 120 determines whether the provided driver alert is working. When true, the method 400 proceeds to 432 and when false the method 400 proceeds to 436. At 432, the controller 120 deescalates the severity/intensity of the driver alert level, which could include revisiting the decision matrix 200 at 416 and the method 400 proceeds to 420. At 436, in contrast, the controller 120 escalates the severity/intensity of the driver alert level, which could include revisiting the decision matrix 200 at 416 and the method 400 proceeds to 420. As previously mentioned, in some cases the lowest or highest possible driver alert could have been initially provided, after which the same or a different driver alert level (e.g., a varying overall type/driver experience) could be tried.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail. The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments. As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories. The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage. Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems. The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An advanced driver-assistance system (ADAS) for a vehicle, the ADAS comprising:
   an anti-lock braking system (ABS) configured to apply a braking force at a driveline of the vehicle;
   a driver monitoring system configured to monitor at least one of an attentiveness or a vehicle interactivity by a driver of the vehicle;
   an audio/visual/haptic (AVH) alert system configured to generate an AVH output for the driver, wherein the AVH output includes at least one of an audio alert, a visual alert, or a haptic alert; and
   a controller in electronic communication with the ABS, the driver monitoring system, and the AVH alert system, wherein:
      the controller is configured to:
         initiate an ADAS event during which the controller takes at least partial control of the vehicle from the driver;
         during the ADAS event, determine a driver attentiveness level and a control urgency level;
         based in part on the driver attentiveness level and the control urgency level, determine a desired driver alert level associated with gaining the driver's attention to retake control of the vehicle; and
         command at least one of the AVH alert system or the ABS according to the desired driver alert level;
      the desired driver alert level is determined from a plurality of predetermined driver alert levels each including at least one of an AVH alert or a degree of a braking event; and
      the plurality of predetermined driver alert levels are defined by a decision matrix that indicates a predetermined driver alert level for each combination of (i) driver attentiveness level, (ii) control urgency level, (iii) vehicle speed, and (iv) road friction.

2. The ADAS of claim 1, wherein the desired driver alert level is determined based in part on at least one of a speed of the vehicle or a friction of a road along which the vehicle is traveling.

3. The ADAS of claim 1, wherein the degree of the braking event includes one of low, medium, or high.

4. The ADAS of claim 3, wherein:
   a low degree braking event includes a first intensity;
   a medium degree braking event includes a second intensity;
   a high degree braking event includes a third intensity;
   the third intensity is greater than the second intensity; and
   the second intensity is greater than the first intensity.

5. The ADAS of claim 4, wherein the first intensity, the second intensity, and the third intensity are each defined by at least one of a braking pressure, a braking duration, or a number of braking pulses.

6. The ADAS of claim 1, wherein the controller is configured to provide multiple desired driver alert levels and command at least one of the AVH alert system or the ABS according to the multiple desired driver alert levels.

7. The ADAS of claim 6, wherein:
the multiple desired driver alert levels escalate in response to the driver's attention not improving; and
the multiple desired driver alert levels deescalate in response to the driver's attention improving.

8. The ADAS of claim 2, wherein the desired driver alert level is determined based in part on at least one of a distance between the vehicle and an additional vehicle, a curvature of the road, a planned trajectory of the vehicle, or a contextual element of the road.

9. A method comprising:
establishing, by a controller of a vehicle, communication with an anti-lock braking system (ABS), a driver monitoring system, and an audio/visual/haptic (AVH) alert system;
initiating, by the controller, an ADAS event during which the controller takes at least partial control of the vehicle from the driver;
during the ADAS event, determining, by the controller, a driver attentiveness level and a control urgency level;
based in part on the driver attentiveness level and the control urgency level, determining, by the controller, a desired driver alert level associated with gaining the driver's attention to retake control of the vehicle; and
commanding, by the controller, at least one of the AVH alert system or the ABS according to the desired driver alert level, wherein:
the desired driver alert level is determined from a plurality of predetermined driver alert levels each including at least one of an AVH alert or degree of a braking event; and
the plurality of predetermined driver alert levels are defined by a decision matrix that indicates a predetermined driver alert level for each combination of (i) driver attentiveness level, (ii) control urgency level, (iii) vehicle speed, and (iv) road friction.

10. The method of claim 9, wherein the desired driver alert level is determined based in part on at least one of a speed of the vehicle or a friction of a road along which the vehicle is traveling.

11. The method of claim 10, wherein the degree of the braking event degree includes low, medium, or high.

12. The method of claim 11, wherein:
a low degree braking event includes a first intensity;
a medium degree braking event includes a second intensity;
a high degree braking event includes a third intensity;
the third intensity is greater than the second intensity; and
the second intensity is greater than the first intensity.

13. The method of claim 12, wherein the first intensity, the second intensity, and the third intensity are each defined by at least one of a braking pressure, a braking duration, or a number of braking pulses.

14. The method of claim 9, wherein the controller is configured to provide multiple desired driver alert levels and command at least one of the AVH alert system or the ABS according to the multiple desired driver alert levels.

15. The method of claim 14, wherein:
the multiple desired driver alert levels escalate in response to the driver's attention not improving; and
the multiple desired driver alert levels deescalate in response to the driver's attention improving.

16. The method of claim 10, wherein the desired driver alert level is determined based in part on at least one of a distance between the vehicle and an additional vehicle, a curvature of the road, a planned trajectory of the vehicle, or a contextual element of the road.

17. An advanced driver-assistance system (ADAS) for a vehicle, the ADAS comprising:
an anti-lock braking system (ABS) configured to apply a braking force at a driveline of the vehicle;
a driver monitoring system configured to monitor at least one of an attentiveness or a vehicle interactivity by a driver of the vehicle;
an audio/visual/haptic (AVH) alert system configured to generate an AVH output for the driver, wherein the AVH output includes at least one of an audio alert, a visual alert, or a haptic alert; and
a controller in electronic communication with the ABS, the driver monitoring system, and the AVH alert system, wherein:
the controller is configured to:
initiate an ADAS event during which the controller takes at least partial control of the vehicle from the driver;
during the ADAS event, determine a driver attentiveness level and a control urgency level;
based in part on the driver attentiveness level and the control urgency level, determine multiple desired driver alert levels each associated with gaining the driver's attention to retake control of the vehicle; and
command at least one of the AVH alert system or the ABS according to the multiple desired driver alert levels;
the multiple desired driver alert levels are determined from a plurality of predetermined driver alert levels each including at least one of an AVH alert or a degree of a braking event;
the multiple desired driver alert levels escalate in response to the driver's attention not improving; and
the multiple desired driver alert levels deescalate in response to the driver's attention improving.

18. The ADAS of claim 17, wherein the multiple desired driver alert levels are determined by the controller based in part on at least one of a speed of the vehicle or a friction of a road along which the vehicle is traveling.

19. A method comprising:
establishing, by a controller of a vehicle, communication with an anti-lock braking system (ABS), a driver monitoring system, and an audio/visual/haptic (AVH) alert system;
initiating, by the controller, an ADAS event during which the controller takes at least partial control of the vehicle from the driver;
during the ADAS event, determining, by the controller, a driver attentiveness level and a control urgency level;
based in part on the driver attentiveness level and the control urgency level, determining, by the controller, multiple desired driver alert levels each associated with gaining the driver's attention to retake control of the vehicle, wherein the multiple desired driver alert levels are determined from a plurality of predetermined driver alert levels each including at least one of an AVH alert or a degree of a braking event;

commanding, by the controller, at least one of the AVH alert system or the ABS according to the multiple desired driver alert levels;
escalating the multiple desired driver alert levels in response to the driver's attention not improving; and
deescalating the multiple desired driver alert levels in response to the driver's attention improving.

* * * * *